United States Patent
Takizawa

(10) Patent No.: US 9,879,999 B2
(45) Date of Patent: Jan. 30, 2018

(54) GYRO SENSOR AND ELECTRONIC APPARATUS

(71) Applicant: Seiko Epson Corporation, Tokyo (JP)

(72) Inventor: Teruo Takizawa, Matsumoto (JP)

(73) Assignee: Seiko Epson Corporation (JP)

( * ) Notice: Subject to any disclaimer, the term of this patent is extended or adjusted under 35 U.S.C. 154(b) by 409 days.

(21) Appl. No.: 13/892,537

(22) Filed: May 13, 2013

(65) Prior Publication Data

US 2013/0298673 A1 Nov. 14, 2013

(30) Foreign Application Priority Data

May 14, 2012 (JP) ................................ 2012-110209

(51) Int. Cl.
*G01C 19/00* (2013.01)
*G01C 19/5719* (2012.01)
*G01C 19/5747* (2012.01)
*G01C 19/5762* (2012.01)

(52) U.S. Cl.
CPC ..... *G01C 19/5719* (2013.01); *G01C 19/5747* (2013.01); *G01C 19/5762* (2013.01)

(58) Field of Classification Search
CPC .................................................. G01C 19/5719
USPC ......................................... 73/504.12, 504.08
See application file for complete search history.

(56) References Cited

U.S. PATENT DOCUMENTS

| | | | | |
|---|---|---|---|---|
| 5,767,405 A | * | 6/1998 | Bernstein ........... | G01C 19/5719 73/504.12 |
| 6,032,531 A | * | 3/2000 | Roszhart .................... | 73/504.04 |
| 7,250,112 B2 | | 7/2007 | Nasiri et al. | |
| 7,458,263 B2 | | 10/2008 | Nasiri et al. | |
| 7,694,563 B2 | * | 4/2010 | Durante et al. ............ | 73/504.12 |
| 2002/0051258 A1 | | 5/2002 | Tamura | |
| 2002/0096973 A1 | * | 7/2002 | Zhang .................... | G10K 9/121 310/334 |
| 2003/0230143 A1 | * | 12/2003 | Mahon ................ | G01P 15/0802 73/514.29 |
| 2005/0056096 A1 | * | 3/2005 | Ozawa ................ | G01P 15/0802 73/514.36 |
| 2008/0196497 A1 | * | 8/2008 | Suzuki ....................... | 73/504.02 |
| 2008/0236280 A1 | * | 10/2008 | Johnson et al. ........... | 73/504.14 |

(Continued)

FOREIGN PATENT DOCUMENTS

| | | |
|---|---|---|
| JP | 08-094654 | 4/1996 |
| JP | 2002-005950 A | 1/2002 |

(Continued)

*Primary Examiner* — Lisa Caputo
*Assistant Examiner* — Tarun Sinha
(74) *Attorney, Agent, or Firm* — Harness, Dickey & Pierce, P.L.C.

(57) ABSTRACT

A gyro sensor includes a substrate, and a first function element, a second function element and a third function element which are arranged above the substrate. With respect to function elements next to each other of the first function element, the second function element and the third function element, the direction of vibration of a vibrating body of one function element is different from the direction of displacement of a movable body of the other function element, and the direction of displacement of a movable body of the one function element is different from the direction of vibration of a vibrating body of the other function element.

22 Claims, 15 Drawing Sheets

(56) References Cited

U.S. PATENT DOCUMENTS

2009/0071247 A1* 3/2009 Konaka ................ G01C 19/574
                                                    73/504.14
2009/0218660 A1* 9/2009 Utsumi .............. B23K 26/0057
                                                    257/620
2012/0291548 A1* 11/2012 Kanemoto ................. 73/504.12

FOREIGN PATENT DOCUMENTS

| JP | 2007-271611 | 10/2007 |
| JP | 2007-322295 | 12/2007 |
| JP | 2009-520950 | 5/2009 |

* cited by examiner

GYRO SENSOR AND ELECTRONIC APPARATUS

BACKGROUND

1. Technical Field

The present invention relates to a gyro sensor and an electronic apparatus.

2. Related Art

Recently, an angular velocity sensor (gyro sensor) which detects angular velocity is developed, for example, using a silicon MEMS (micro electro-mechanical system) technique. The application of the gyro sensor is quickly expanding, for example, to camera shake correction function of a digital still camera and the like, and a small-size gyro sensor with the sensitivity of a multi-axis sensor is demanded.

For example, JP-A-2007-322295 discloses a technique in which an angular velocity sensor having sensitivity on an X axis, an angular velocity sensor having sensitivity on a Y axis, and an angular velocity sensor having sensitivity on a Z axis are formed on the same substrate.

However, in JP-A-2007-322295, of the angular velocity sensors arranged next to each other, the driving direction of one angular velocity sensor may be the same as the direction of displacement of another angular velocity sensor due to a Coriolis force. For example, in FIG. 1 of JP-A-2007-322295, a first angular velocity sensor and a second angular velocity sensor have two different driving directions orthogonal to each other, and the drive vibration of at least one of the angular velocity sensors influences Coriolis detection by a third angular velocity sensor. This causes mechanical crosstalk between axes. Therefore, the drive vibration of one angular velocity sensor may influence displacement of another angular velocity sensor due to a Coriolis force. Therefore, the noise characteristic of this another angular velocity sensor may be lowered, disabling the angular velocity sensor from performing accurate detection.

SUMMARY

An advantage of some aspects of the invention is that a gyro sensor capable of realizing high detection accuracy with a reduced size can be provided. Another advantage of some aspects of the invention is that an electronic apparatus having this gyro sensor can be provided.

The invention can be implemented as the following forms or application examples.

Application Example 1

This application example of the invention is directed to a gyro sensor including a substrate, and a first function element, a second function element and a third function element which are arranged on the substrate. The first function element includes a first vibrating body which vibrates in a direction of a first axis, and a first movable body which is supported on the first vibrating body and is displaced in accordance with an angular velocity about a second axis orthogonal to the first axis, into a direction of a third axis orthogonal to the first axis and the second axis. The second function element includes a second vibrating body which vibrates in the direction of the second axis, and a second movable body which is supported on the second vibrating body and is displaced in the direction of the third axis in accordance with an angular velocity about the first axis. The third function element includes a third vibrating body which vibrates in the direction of the first axis or in the direction of the second axis, and a third movable body which is supported on the third vibrating body and is displaced in a direction orthogonal to the direction of vibration of the third vibrating body and the direction of the third axis in accordance with an angular velocity about the third axis. With respect to function elements next to each other of the first function element, the second function element and the third function element, the direction of vibration of the vibrating body of one function element is different from the direction of displacement of the movable body of the other function element, and the direction of displacement of the movable body of the one function element is different from the direction of vibration of the vibrating body of the other function element.

According to such a gyro sensor, in the case where the third vibrating body vibrates in the direction of the first axis, the first function element is provided between the second function element in which the second vibrating body vibrates in the direction of the second axis and the third function element in which the third movable body is made to vibrate in the direction of the second axis by a Coriolis force. Therefore, a long distance can be provided between the second function element and the third function element and reduction in size can be realized. Thus, the influence of the vibration of the second vibrating body via the substrate on the displacement of the third movable body due to a Coriolis force can be restrained. Consequently, according to such a gyro sensor, the deterioration in the noise characteristic can be restrained and high detection accuracy can be achieved while reduction in size is realized. Meanwhile, in the case where the third vibrating body vibrates in the direction of the second axis, the second function element is provided between the first function element in which the first vibrating body vibrates in the direction of the first axis and the third function element in which the third movable body is made to vibrate in the direction of the first axis by a Coriolis force. Therefore, according to such a gyro sensor, high detection accuracy can be achieved while reduction in size is realized, as in the case where the third vibrating body vibrates in the direction of the first axis.

Application Example 2

The gyro sensor according to the application example may be configured such that the second function element is arranged on one side of the first function element, and the third function element is arranged on the other side of the first function element.

Application Example 3

The gyro sensor according to the application example may be configured such that the first function element is arranged on one side of the second function element, and the third function element is provided on the other side of the second function element.

Application Example 4

The gyro sensor according to the application example may be configured such that the first function element, the second function element, and the third function element are arrayed linearly on the substrate.

According to such a gyro sensor, high detection accuracy can be achieved while reduction in size is realized.

Application Example 5

The gyro sensor according to the application example may be configured such that a first recessed portion, a second recessed portion, and a third recessed portion are provided on the substrate, the first vibrating body and the first movable body are provided over the first recessed portion, the second vibrating body and the second movable body are provided over the second recessed portion, and the third vibrating body and the third movable body are provided over the third recessed portion.

According to such a gyro sensor, in the case where the third vibrating body vibrates in the direction of the first axis, the first recessed portion is provided between the second function element and the third function element, as viewed in a plan view. Therefore, the influence of the vibration of the second vibrating body via the substrate on the displacement of the third movable body due to a Coriolis force can be restrained more securely. Meanwhile, in the case where the third vibrating body vibrates in the direction of the second axis, the second recessed portion is provided between the first function element and the third function element, as viewed in a plan view. Therefore, the influence of the vibration of the first vibrating body via the substrate on the displacement of the third movable body due to a Coriolis force can be restrained more securely.

Application Example 6

The gyro sensor according to the application example may be configured such that a groove portion is provided on the substrate, and the groove portion is provided between the one function element and the other function element, as viewed in a plan view.

According to such a gyro sensor, in the case where the third vibrating body vibrates in the direction of the first axis, the groove portion is provided between the second function element and the third function element, as viewed in a plan view. Therefore, the influence of the vibration of the second vibrating body via the substrate on the displacement of the third movable body due to a Coriolis force can be restrained more securely. Meanwhile, in the case where the third vibrating body vibrates in the direction of the second axis, the groove portion is provided between the first function element and the third function element, as viewed in a plan view. Therefore, the influence of the vibration of the first vibrating body via the substrate on the displacement of the third movable body due to a Coriolis force can be restrained more securely.

Application Example 7

The gyro sensor according to the application example may be configured such that the direction of the third axis is the same as a direction of thickness of the substrate.

According to such a gyro sensor, the direction of vibration of the first vibrating body, the second vibrating body, and the third vibrating body is the direction of the first axis or the direction of the second axis. Therefore, a movable drive electrode portion and a fixed drive electrode portion can be formed, for example, by patterning the same silicon substrate with photolithography and etching techniques. Thus, the gap between the movable drive electrode portion and the fixed drive electrode portion can be formed at a low cost and with high accuracy.

Application Example 8

The gyro sensor according to the application example may be configured such that a material of the substrate is glass, and a material of the first vibrating body, the first movable body, the second vibrating body, the second movable body, the third vibrating body, and the third movable body is silicon.

According to such a gyro sensor, a fixed portion provided integrally with the vibrating bodies and the movable bodies can be made of silicon, and the fixed portion and the substrate can be joined together by anodic bonding.

Application Example 9

The gyro sensor according to the application example may be configured such that the third vibrating body vibrates in the direction of the first axis, and the first function element is provided between the second function element and the third function element.

According to such a gyro sensor, the first function element is provided between the second function element in which the second vibrating body vibrates in the direction of the second axis and the third function element in which the third movable body is made to vibrate in the direction of the second axis by a Coriolis force. Therefore, according to such a gyro sensor, high detection accuracy can be achieved while reduction in size is realized.

Application Example 10

The gyro sensor according to the application example may be configured such that the third vibrating body vibrates in the direction of the second axis, and the second function element is provided between the first function element and the third function element.

According to such a gyro sensor, the second function element is provided between the first function element in which the first vibrating body vibrates in the direction of the first axis and the third function element in which the third movable body is made to vibrate in the direction of the first axis by a Coriolis force. Therefore, according to such a gyro sensor, high detection accuracy can be achieved while reduction in size is realized.

Application Example 11

The gyro sensor according to the application example may be configured such that at least one function element of the first function element, the second function element, and the third function element vibrates in a tuning fork vibration pattern.

According to such a gyro sensor, detection accuracy can be improved.

Application Example 12

This application example of the invention is directed to an electronic apparatus including the gyro sensor according to the above application example.

Such an electronic apparatus has the gyro sensor according to the application examples and therefore can achieve high detection accuracy while being reduced in size.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail with reference to the drawings. The following embodiments are not to unduly limit the contents of the invention described in the appended claims. Not all the configurations described hereinafter are essential configuration requirements, either.

1. First Embodiment 1.1. Gyro Sensor

Figure 1:
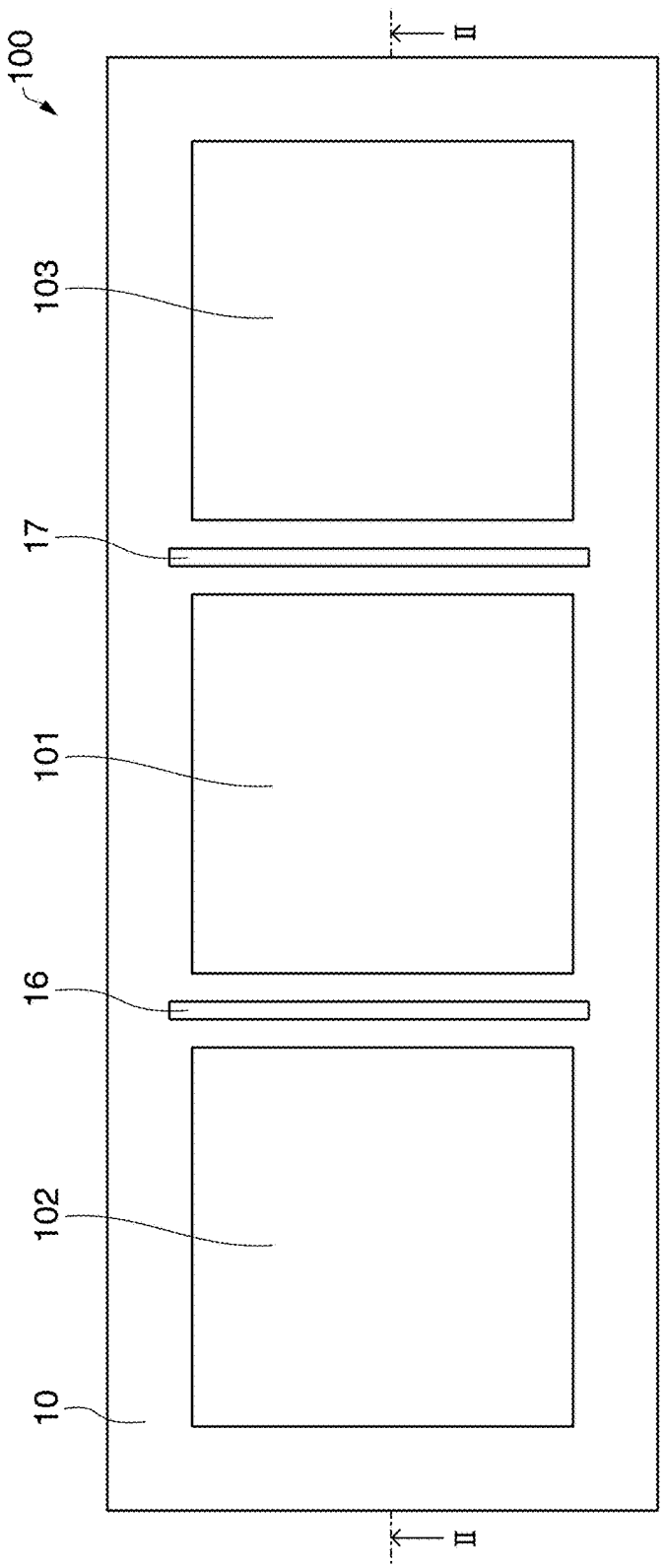
FIG. 1 is a plan view schematically showing a gyro sensor according to a first embodiment.
Figure 1:
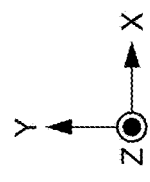
Figure 2:
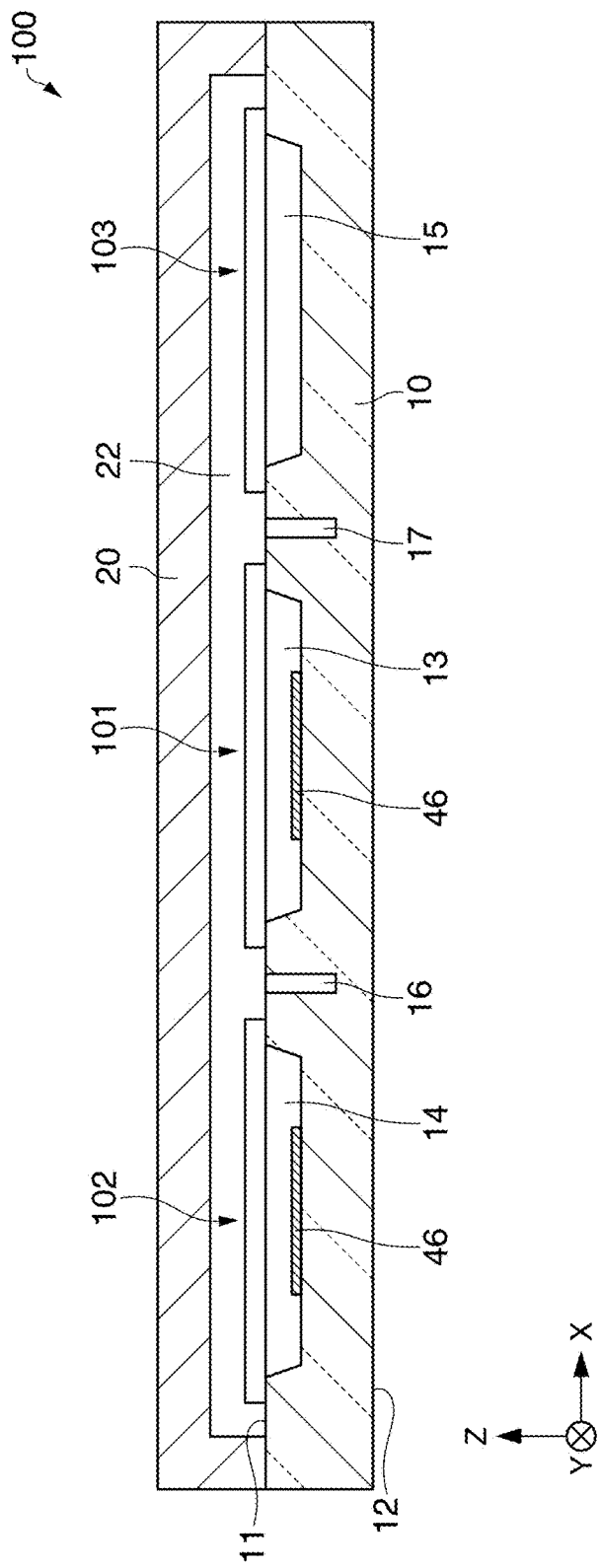
FIG. 2 is a sectional view schematically showing the gyro sensor according to the first embodiment.

First, a gyro sensor according to a first embodiment will be described with reference to the drawings. FIG. 1 is a plan view schematically showing a gyro sensor 100 according to the first embodiment. FIG. 2 is a sectional view taken along a line II-II in FIG. 1, schematically showing the gyro sensor 100 according to the first embodiment.

For convenience, a lid body 20 is not shown in FIG. 1. In FIGS. 1 and 2, a first function element 101, a second function element 102, and a third function element 103 are shown in a simplified manner. In FIGS. 1 and 2, and in FIGS. 3 to 5 and FIGS. 8 to 12, which will be referred to later, an X axis, a Y axis, and a Z axis are shown as three axes that are orthogonal to each other. In the first embodiment, and in a second embodiment, which will be described later, a direction parallel to the X axis (first axis) is called X-axis direction. A direction parallel to the Y axis (second axis) is called Y-axis direction. A direction parallel to the Z axis (third axis) is called Z-axis direction.

The gyro sensor 100 includes a substrate 10, the first function element 101, the second function element 102, and the third function element 103, as shown in FIGS. 1 and 2. The gyro sensor 100 can further include the lid body 20.

The material of the substrate 10 is, for example, glass. The direction of thickness of the substrate 10 is the same as (parallel to) the Z-axis direction. The substrate 10 has, for example, a rectangular plane shape (as viewed from the Z-axis direction). The substrate 10 has a first surface 11 and a second surface 12 opposite to the first surface 11.

On the first surface 11 of the substrate 10, a first recessed portion 13, a second recessed portion 14, and a third recessed portion 15 are provided. Moreover, a first groove portion 16 and a second groove portion 17 are provided on the first surface 11 of the substrate 10. The depth of the groove portions 16, 17 is, for example, greater than the depth of the recessed portions 13, 14, 15 and 50% of the thickness of the substrate 10 or greater.

The first function element 101 can detect angular velocity about the Y axis. The second function element 102 can detect angular velocity about the X axis. The third function element 103 can detect angular velocity about the Z axis.

The first function element 101, the second function element 102, and the third function element 103 are provided (arranged) on the substrate 10 (on the side of the first surface 11). In the gyro sensor 100, the first function element 101, second function element 102, and the third function element 103 are arrayed linearly and the first function element 101 is provided between the second function element 102 and the third function element 103. That is, in the gyro sensor 100, the second function element 102, the first function element 101, and the third function element 103 are arrayed linearly in this order. In the example shown in FIG. 1, the function elements 101, 102, 103 are arrayed in the X-axis direction (along the X axis) as viewed in a plan view (as viewed from the Z-axis direction). However, the direction in which the function elements 101, 102, 103 are arrayed is not particularly limited. For example, the function elements 101, 102, 103 may be arrayed in the Y-axis direction.

A part of the first function element 101 overlaps the first recessed portion 13, as viewed in a plan view. Part of the second function element 102 overlaps the second recessed portion 14, as viewed in a plan view. A part of the third function element 103 overlaps the third recessed portion 15, as viewed in a plan view.

The first groove portion 16 is provided between the first function element 101 and the second function element 102, as viewed in a plan view. The second groove portion 17 is provided between the first function element 101 and the third function element 103, as viewed in a plan view. In the example shown in FIG. 1, the groove portions 16, 17 extend in the Y-axis direction. Although not shown, a groove portion may be provided, surrounding each of the function elements 101, 102, 103, as viewed in a plan view.

The lid body 20 is provided on the substrate 10. The material of the lid body 20 is, for example, silicon. The lid body 20 is joined to the first surface 11 of the substrate 10, for example, by anodic bonding. The substrate 10 and the lid body 20 can form a space 22 which accommodates the function elements 101, 102, 103. The space 22 is airtightly sealed, for example, in a reduced-pressure state. Thus, damping of a vibration phenomenon of the gyro sensor 100 due to air viscosity can be restrained.

Hereinafter, the first function element 101, the second function element 102, and the third function element 103 will be described.

1 First Function Element

Figure 3:
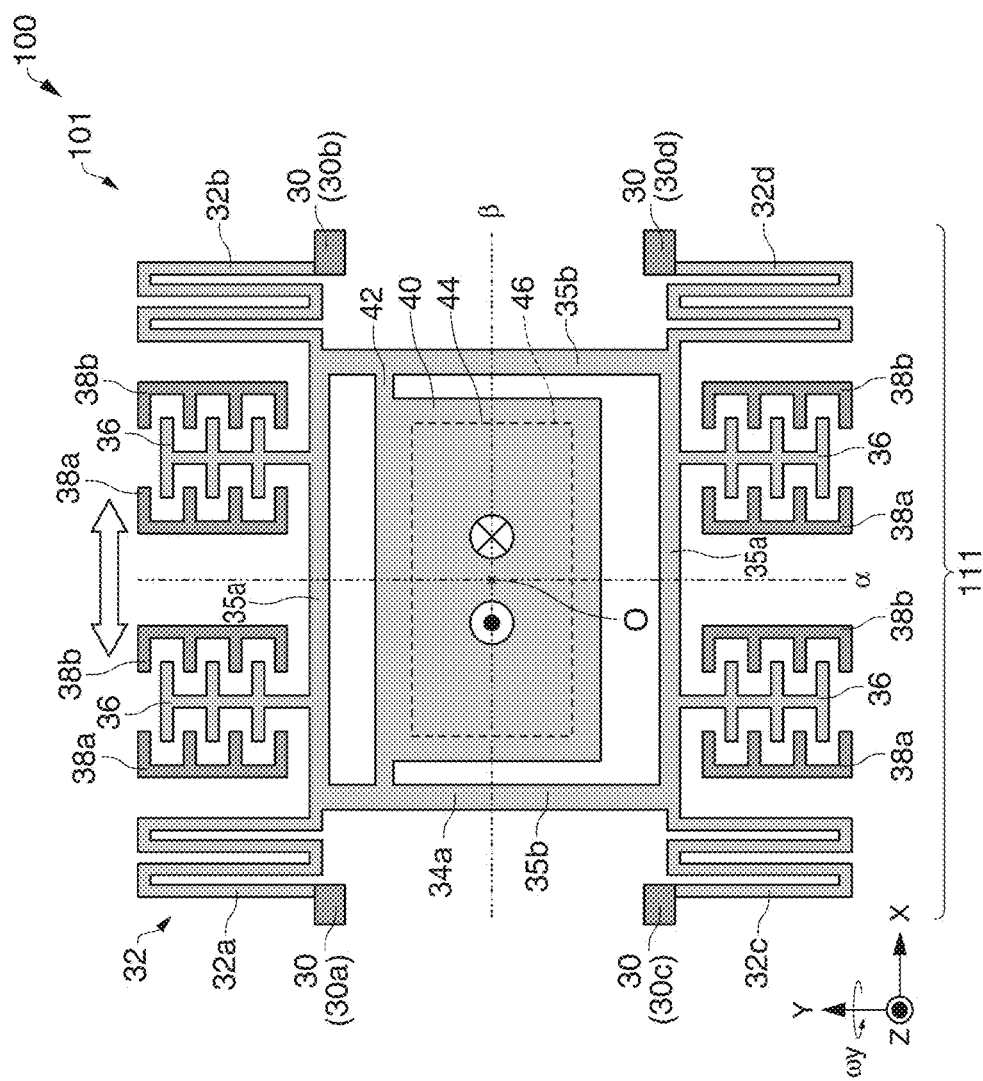
FIG. 3 is a plan view schematically showing a first function element of the gyro sensor according to the first embodiment.

First, the configuration of the first function element 101 will be described. FIG. 3 is a plan view schematically showing the first function element 101.

The first function element 101 includes a structure body 111, as shown in FIG. 3. The structure body 111 has a first vibrating body 34a, a first movable body 40, a first movable detection electrode portion (first movable electrode portion) 44, and a first fixed detection electrode portion (first fixed electrode portion) 46. The structure body 111 can further include a fixed portion 30, a drive spring portion 32, a movable drive electrode portion 36, fixed drive electrode portions 38a, 38b, and a beam portion 42.

The fixed portion 30, the drive spring portion 32, the vibrating body 34a, the movable drive electrode portion 36, the movable body 40, the beam portion 42, and the movable detection electrode portion 44 are provided integrally, for example, by patterning a silicon substrate. The material of the fixed portion 30, the drive spring portion 32, the vibrating body 34a, the movable drive electrode portion 36, the fixed drive electrode portions 38a, 38b, the movable body 40, the beam portion 42, and the movable detection electrode portion 44 is, for example, silicon that is made electrically conductive by being doped with impurities such as phosphorus and boron.

The vibrating body 34a is provided over the first recessed portion 13. In the example shown in FIG. 3, the vibrating body 34a is a rectangular frame body, as viewed in a plan view, and includes a first extending portion 35a extending in the X-axis direction and a second extending portion 35b extending in the Y-axis direction. A lateral side in the X-axis direction of the vibrating body 34a (a lateral side having a perpendicular line parallel to the X axis) is connected to the drive spring portion 32. The vibrating body 34a can be made to vibrate in the X-axis direction (along the X axis) by the movable drive electrode portion 36 and the fixed drive electrode portions 38a, 38b.

The fixed portion 30 is fixed to the substrate 10. The fixed portion 30 is joined to the first surface 11 of the substrate 10, for example, by anodic bonding. In the illustrated example, four fixed portions 30 are provided.

The drive spring portion 32 connects the fixed portions 30 (30a, 30b, 30c, 30d) to the vibrating body 34a. In the illustrated example, the drive spring portion 32 includes four springs 32a, 32b, 32c, 32d. The spring 32a connects the fixed portion 30a to the vibrating body 34a. The spring 32b connects the fixed portion 30b to the vibrating body 34a. The spring 32c connects the fixed portion 30c to the vibrating body 34a. The spring 32d connects the fixed portion 30d to the vibrating body 34a.

The springs 32a, 32b, 32c, 32d extend in the X-axis direction while going back and forth in the Y-axis direction. The spring 32a and the spring 32b pass a center O of the vibrating body 34a as viewed in a plan view and are provided symmetrically about an axis α that is parallel to the Y axis. Similarly, the spring 32c and the spring 32d are provided symmetrically about the axis α. The spring 32a and the spring 32c pass the center O of the vibrating body 34a as viewed in a plan view and are provided symmetrically about an axis β that is parallel to the X axis. Similarly, the spring 32b and the spring 32d are provided symmetrically about the axis β. Thus, deformation of the drive spring portion 32 in the Y-axis direction and in the Z-axis direction is restrained and the drive spring portion 32 can expand and contract smoothly in the X-axis direction, which is the direction of vibration of the vibrating body 34a.

The movable drive electrode portion 36 is provided on the vibrating body 34a. More specifically, the movable drive electrode portion 36 is connected to the first extending portion 35a of the vibrating body 34a. In the illustrated example, four movable drive electrode portions 36 are provided. The movable drive electrode portion 36 may be a comb-teeth electrode having a trunk portion extending in the Y-axis direction from the vibrating body 34a and plural branch portions extending in the X-axis direction from the trunk portion, as shown in FIG. 3.

The fixed drive electrode portions 38a, 38b are fixed to the substrate 10. The fixed drive electrode portions 38a, 38b are joined to the first surface 11 of the substrate 10, for example, by anodic bonding. The fixed drive electrode portions 38a, 38b are provided facing the movable drive electrode portion 36, and the movable drive electrode portion 36 is arranged between the fixed drive electrode portions 38a, 38b. In the illustrated example, the fixed drive electrode portion 38a is provided on the −X axis direction side of the movable drive electrode portion 36, and the fixed drive electrode portion 38b is provided on the +X axis direction side of the movable drive electrode portion 36. In the case where the movable drive electrode portion 36 has a comb-teeth shape as shown in FIG. 3, the fixed drive electrode portions 38a, 38b may have a comb-teeth shape corresponding to the movable drive electrode portion 36.

The movable body 40 is provided over the first recessed portion 13. The movable body 40 is supported on the vibrating body 34a via the beam portion 42. The movable body 40 is provided inside the frame-shaped vibrating body 34a, as viewed in a plan view. The movable body 40 has a plate-like shape. The movable body 40 is connected to a lateral side (a lateral side having a perpendicular line parallel to the X axis) in the X-axis direction of the vibrating body 34a (the second extending portion 35b) by the beam portion 42, which serves as an axis of rotation.

The beam portion 42 is provided at a position offset from the center of gravity of the movable body 40. The beam portion 42 is provided along the X axis. The beam portion 42 can be torsionally deformed and this torsional deformation can displace the movable body 40 in the Z-axis direction. In the illustrated example, the movable body 40 extends in the −Y axis direction from the beam portion 42. However, the direction of extension of the movable body 40 is not particularly limited.

Although not shown, two beam portions 42 may be provided and a movable body 40 extending in the −Y axis direction from one beam portion 42 and a movable body 40 extending in the +Y axis direction from the other beam portion 42 may be provided.

The movable detection electrode portion 44 is provided on the movable body 40. In the illustrated example, the movable detection electrode portion 44 is a portion of the movable body 40 that overlaps the fixed detection electrode portion 46, as viewed in a plan view. The movable detection electrode portion 44 is a portion of the movable body 40 that forms an electrostatic capacitance with the fixed detection electrode portion 46. In the first function element 101, the movable detection electrode portion 44 may be provided by forming the movable body 40 made of an electrically conductive material, or the movable detection electrode portion 44 made of a conductor layer such as a metal may be provided on the surface of the movable body 40. In the illustrated example, the movable detection electrode portion 44 is provided by forming the movable body 40 made of an electrically conductive material (silicon doped with impurity).

The fixed detection electrode portion 46 is fixed to the substrate 10 and provided facing the movable detection electrode portion 44. The fixed detection electrode portion 46 is provided, for example, on a bottom surface of the first recessed portion 13 (a surface of the substrate 10 that prescribes the first recessed portion 13). In the example shown in FIG. 3, the shape of the fixed detection electrode portion 46 is rectangular, as viewed in a plan view.

The material of the fixed detection electrode portion 46 is, for example, aluminum, gold, ITO (indium tin oxide) and the like. By using a transparent electrode material such as ITO for the fixed detection electrode portion 46, a foreign matter or the like existing on the fixed detection electrode portion 46 can be visually recognized easily from the opposite side of the second surface 12 of the substrate 10 if the substrate 10 is a transparent substrate (glass substrate).

Next, the operation of the first function element 101 will be described.

As a voltage is applied between the movable drive electrode portion 36 and the fixed drive electrode portions 38a, 38b by a power source, not shown, an electrostatic force can be generated between the movable drive electrode portion 36 and the fixed drive electrode portions 38a, 38b. Thus, the vibrating body 34a can be made to vibrate in the X-axis direction while the drive spring portion 32 is made to expand and contract in the X-axis direction. By decreasing the distance (gap) between the movable drive electrode portion 36 and the fixed drive electrode portions 38a, 38b, the electrostatic force acting between the movable drive electrode portion 36 and the fixed drive electrode portions 38a, 38b can be increased.

More specifically, a first alternating voltage is applied between the movable drive electrode portion 36 and the fixed drive electrode portion 38a and a second alternating voltage with a phase 180 degrees shifted from the first alternating voltage is applied between the movable drive electrode portion 36 and the fixed drive electrode portion 38b.

Since the movable body 40 is supported on the vibrating body 34a via the beam portion 42 as described above, the movable body 40, too, vibrates in the X-axis direction with the vibration of the vibrating body 34a.

If an angular velocity about the Y axis (an angular velocity around the Y axis as its axis) $\omega y$ is applied to the first function element 101 in the state where the vibrating body 34a vibrates in the X-axis direction, a Coriolis force acts and causes the movable body 40 to be displaced in the Z-axis direction. As the movable body 40 is displaced in the Z-axis direction, the movable detection electrode portion 44 moves toward or away from the fixed detection electrode portion 46. Therefore, the electrostatic capacitance between the movable detection electrode portion 44 and the fixed detection electrode portion 46 changes. By detecting the amount of change in the electrostatic capacitance between the movable detection electrode portion 44 and the fixed detection electrode portion 46, the angular velocity $\omega y$ about the Y axis can be found.

While the form in which the vibrating body 34a is driven by an electrostatic force (electrostatic drive method) is described above, the method for driving the vibrating body 34a is not particularly limited. A piezoelectric drive method, an electromagnetic drive method using a Lorentz force of a magnetic field, and the like can also be applied.

2 Second Function Element

Figure 4:
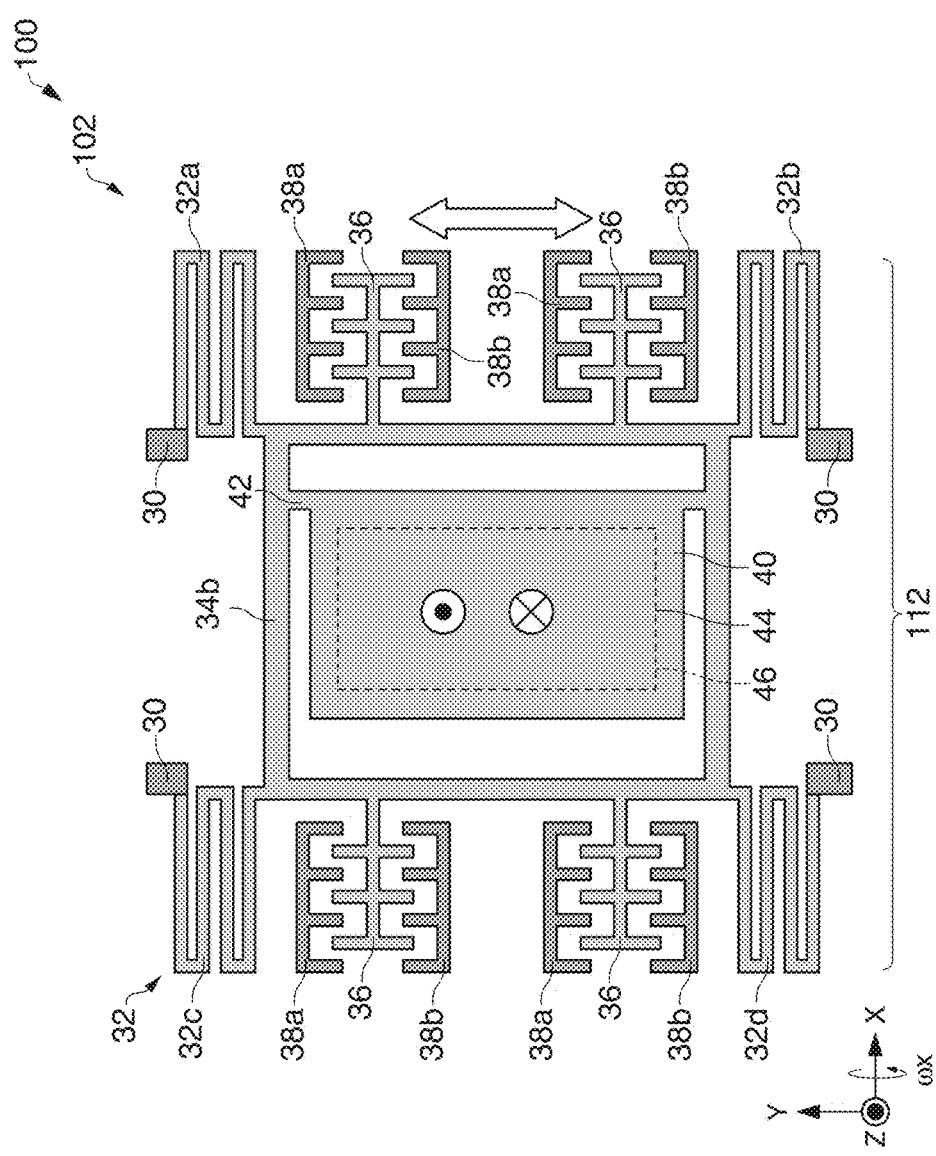
FIG. 4 is a plan view schematically showing a second function element of the gyro sensor according to the first embodiment.

Next, the second function element 102 will be described. FIG. 4 is a plan view schematically showing the second function element 102.

The second function element 102 includes a structure body 112, as shown in FIG. 4. The structure body 112 has a second vibrating body 34b, a second movable body 40, a second movable detection electrode portion (second movable electrode portion) 44, and a second fixed detection electrode portion (second fixed electrode portion) 46. The second function element 102 can further include a fixed portion 30, a drive spring portion 32, a movable drive electrode portion 36, fixed drive electrode portions 38a, 38b, and a beam portion 42.

The vibrating body 34b and the movable body 40 of the second function element 102 are provided over the second recessed portion 14. The fixed detection electrode portion 46 of the second function element is provided, for example, on a bottom surface of the second recessed portion 14 (a surface of the substrate 10 that prescribes the second recessed portion 14).

The second function element 102 is in the form in which the first function element 101 shown in FIG. 3 is rotated 90 degrees about the Z axis as its axis of rotation, as shown in FIG. 4. Therefore, the detailed description of the second function element 102 is omitted. The vibrating body 34b may be the same or similar to vibrating body 34a, and, as such, the detailed description of the features relating to vibrating body 34b which have already been described in relation to vibrating body 34a is omitted.

In the second function element 102, the vibrating body 34b vibrates in the Y-axis direction. If an angular velocity about the X axis (an angular velocity around the X axis as its axis) $\omega x$ is applied in the state where the vibrating body 34b vibrates in the Y-axis direction, a Coriolis force acts and causes the movable body 40 to be displaced in the Z-axis direction. Therefore, the electrostatic capacitance between the movable detection electrode portion 44 and the fixed detection electrode portion 46 changes and the angular velocity $\omega x$ about the X axis can be found.

3 Third Function Element

Figure 5:
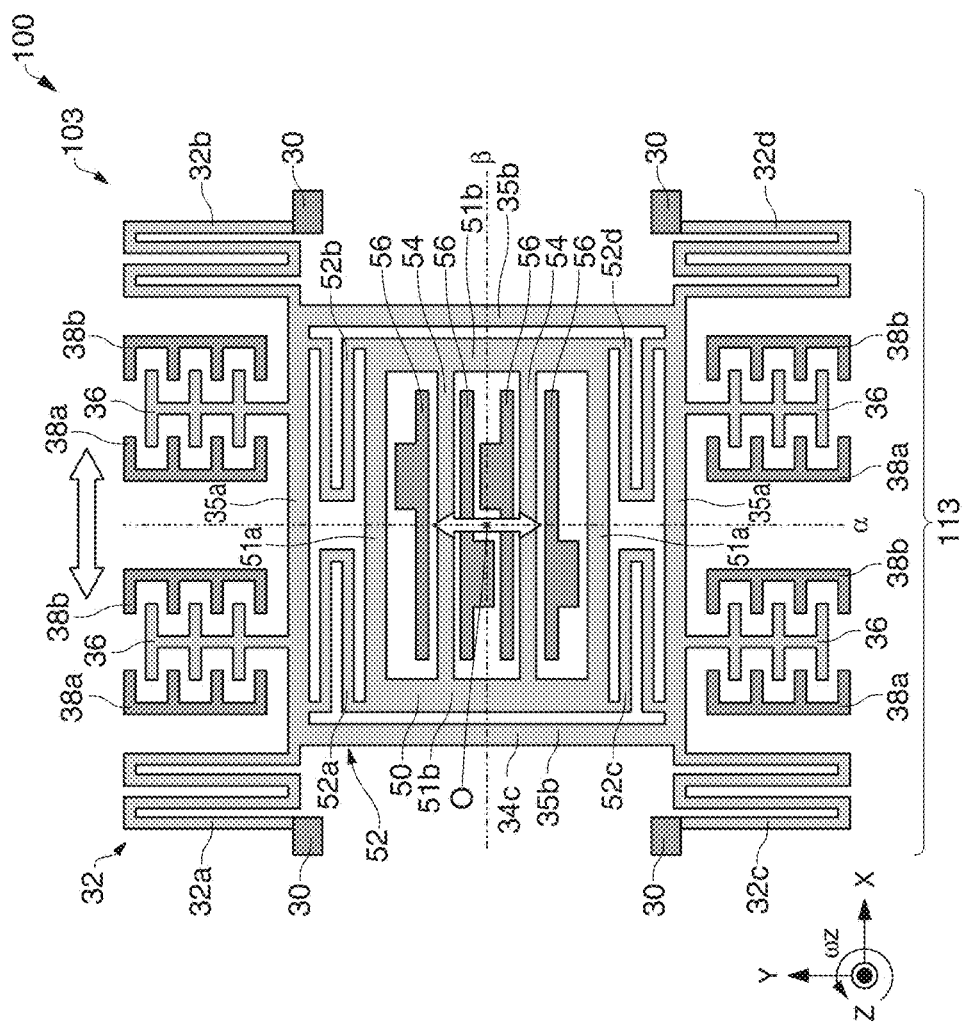
FIG. 5 is a plan view schematically showing a third function element of the gyro sensor according to the first embodiment.

Next, the configuration of the third function element 103 will be described. FIG. 5 is a plan view schematically showing the third function element 103.

Hereinafter, in the third function element 103 shown in FIG. 5, members having similar functions to component members of the first function element 101 shown in FIG. 1 are denoted by the same reference numerals and will not be described further in detail.

The third function element 103 includes a structure body 113, as shown in FIG. 5. The structure body 113 has a third vibrating body 34c, a third movable body 50, a third movable detection electrode portion (third movable electrode portion) 54, and a third fixed detection electrode portion (third fixed electrode portion) 56. The structure body 113 can further include a fixed portion 30, a drive spring portion 32, a movable drive electrode portion 36, fixed drive electrode portions 38a, 38b, and a detection spring portion 52. The vibrating body 34c of the third function element 103 is provided over the third recessed portion 15. The vibrating body 34c may be the same or similar to vibrating bodies 34a and 34b. As such, the detailed description of the features relating to vibrating body 34c which have already been described in relation to vibrating bodies 34a and 34b is omitted.

The movable body 50 is provided over the third recessed portion 15. The movable body 50 is supported by the vibrating body 34c via the detection spring portion 52. The movable body 50 is provided inside the frame-shaped vibrating body 34c, as viewed in a plan view. In the example shown in FIG. 5, the movable body 50 is a rectangular frame body as viewed in a plan view and includes a third extending portion 51a extending in the X-axis direction and a fourth extending portion 51b extending in the Y-axis direction. A lateral side in the Y-axis direction of the movable body 50 (a lateral side having a perpendicular line parallel to the Y axis) is connected to the detection spring portion 52.

The detection spring portion 52 connects the vibrating body 34c to the movable body 50. In the illustrated example, the detection spring portion 52 has four springs 52a, 52b, 52c, 52d. The springs 52a, 52b connect the first extending portion 35a arranged on the +Y axis direction side of the movable body 50, to the movable body 50. The springs 52c, 52d connect the first extending portion 35a arranged on the −Y axis direction side of the movable body 50, to the movable body 50.

The springs 52a, 52b, 52c, 52d extend in the Y-axis direction while going back and forth in the X-axis direction. The spring 52a and the spring 52b pass a center O of the vibrating body 34c as viewed in a plan view and are provided symmetrically about an axis α that is parallel to the Y axis. Similarly, the spring 52c and the spring 52d are provided symmetrically about the axis α. The spring 52a and the spring 52c pass the center O of the vibrating body 34c as viewed in a plan view and are provided symmetrically about an axis β that is parallel to the X axis. Similarly, the spring 52b and the spring 52d are provided symmetrically about the axis β. Thus, the deformation of the detection spring portion 52 in the X-axis direction and in the Z-axis direction is restrained and the detection spring portion 52 can expand and contract smoothly in the Y-axis direction, which is the direction of displacement of the movable body 50.

The movable detection electrode portion 54 is provided on the movable body 50. The movable detection electrode portion 54 extends in the X-axis direction, for example, from the one fourth extending portion 51b of the movable body 50 to the other fourth extending portion 51b. In the illustrated example, two movable detection electrode portions 54 are provided.

The fixed detection electrode portion 56 is fixed to the substrate 10 and provided facing the movable detection electrode portion 54. The fixed detection electrode portion 56 is joined to a bottom surface of the third recessed portion 15 (a surface of the substrate 10 that prescribes the third recessed portion 15), for example, by anodic bonding. The fixed detection electrode portion 56 is provided inside the frame-shaped movable body 50. In the illustrated example, the fixed detection electrode portions 56 are provided on both sides of the movable detection electrode portion 54.

The fixed portion 30, the drive spring portion 32, the vibrating body 34c, the movable drive electrode portion 36, the movable body 50, the detection spring portion 52, and the movable detection electrode portion 54 are provided integrally, for example, by patterning a silicon substrate. The material of the fixed portion 30, the drive spring portion 32, the vibrating body 34c, the movable drive electrode portion 36, the fixed drive electrode portions 38a, 38b, the movable body 50, the detection spring portion 52, the movable detection electrode portion 54, and the fixed detection electrode portion 56 is, for example, silicon that is made electrically conductive by being doped with impurities such as phosphorus and boron.

Next, the operation of the third function element 103 will be described.

As a voltage is applied between the movable drive electrode portion 36 and the fixed drive electrode portions 38a, 38b by a power source, not shown, an electrostatic force can be generated between the movable drive electrode portion 36 and the fixed drive electrode portions 38a, 38b. Thus, the vibrating body 34c can be made to vibrate in the X-axis direction while the drive spring portion 32 is made to expand and contract in the X-axis direction.

Since the movable body 50 is supported on the vibrating body 34c via the detection spring portion 52 as described above, the movable body 50, too, vibrates in the X-axis direction with the vibration of the vibrating body 34c.

If an angular velocity about the Z axis (an angular velocity around the Z axis as its axis) ωz is applied to the third function element 103 in the state where the vibrating body 34c vibrates in the X-axis direction, a Coriolis force acts and causes the movable body 50 to be displaced in the Y-axis direction. As the movable body 50 is displaced in the Y-axis direction, the distance between the movable detection electrode portion 54 and the fixed detection electrode portion 56 changes. Therefore, the electrostatic capacitance between the movable detection electrode portion 54 and the fixed detection electrode portion 56 changes. By detecting the amount of change in the electrostatic capacitance between the movable detection electrode portion 54 and the fixed detection electrode portion 56, the angular velocity ωz about the Z axis can be found.

As described above, in the gyro sensor 100, angular velocities about the three axes orthogonal to each other (X axis, Y axis, and Z axis) can be detected.

The gyro sensor 100 according to the first embodiment has, for example, the following characteristics.

According to the gyro sensor 100, the function elements 101, 102, 103 are arrayed linearly and the first function element 101 is provided between the second function element 102 and the third function element 103. Therefore, in the gyro sensor 100, with respect to function elements that are next to each other of the function elements 101, 102, 103, the direction of vibration of the vibrating body 34a, 34b, 34c of one function element and the direction of displacement of the movable body 40 (or the movable body 50) (direction in which the movable body is displaced by a Coriolis force) of the other function element are different from each other, and the direction of displacement of the movable body 40 (or the movable body 50) of the one function element and the direction of vibration of the vibrating body 34a, 34b, 34c of the other function element are different from each other. That is, with respect to the function elements 101, 102, which are next to each other, the direction of vibration of the vibrating body 34a of the first function element 101 (X-axis direction) and the direction of displacement of the movable body 40 of the second function element 102 (Z-axis direction) are different from each other, and the direction of displacement of the movable body 40 of the first function element 101 (Z-axis direction) and the direction of vibration of the vibrating body 34b of the second function element 102 (Y-axis direction) are different from each other. Also, with respect to the function elements 101, 103, which are next to each other, the direction of vibration of the vibrating body 34a of the first function element 101 (X-axis direction) and the direction of displacement of the movable body 50 of the third function element 103 (Y-axis direction) are different from each other, and the direction of displacement of the movable body 40 of the first function element 101 (Z-axis direction) and the direction of vibration of the vibrating body 34c of the third function element 103 (X-axis direction) are different from each other.

That is, in the gyro sensor 100, the first function element 101 is provided between the second function element 102 in which the vibrating body 34b vibrates in the Y-axis direction and the third function element 103 in which the movable body 50 is displaced in the Y-axis direction by a Coriolis force. Therefore, a long distance can be provided between the second function element 102 and the third function element 103 and reduction in size can be realized. Thus, in the gyro sensor 100, the influence of the vibration of the vibrating body 34b of the second function element 102 via the substrate 10 on the displacement of the movable body 50 of the third function element 103 due to a Coriolis force can be restrained. More specifically, in the gyro sensor 100, the action (cross-coupling) of the vibration of the vibrating body 34b of the second function element 102 with the movable body 50 of the third function element 103, and the excitation of an unwanted vibration mode by the vibration of the vibrating body 34b of the second function element 102 can be restrained. Consequently, in the gyro sensor 100, deterioration in noise characteristics can be retrained and high detection accuracy can be achieved while reduction in size is realized.

According to the gyro sensor 100, the vibrating body 34a and the movable body 40 of the first function element 101 are provided over the first recessed portion 13. The vibrating body 34b and the movable body 40 of the second function element 102 are provided over the second recessed portion 14. The vibrating body 34c and the movable body 50 of the third function element 103 are provided over the third recessed portion 15. That is, the first recessed portion 13 is provided between the second function element 102 and the third function element 103, as viewed in a plan view. Therefore, the influence of the vibration of the vibrating body 34b of the second function element 102 via the substrate 10 on the displacement of the movable body 50 of the third function element 103 due to a Coriolis force can be restrained more securely.

According to the gyro sensor 100, the first groove portion 16 is provided between the first function element 101 and the second function element 102, and the second groove portion 17 is provided between the first function element 101 and the third function element 103, as viewed in a plan view. That is, the groove portions 16, 17 are provided between the second function element 102 and the third function element 103, as viewed in a plan view. Therefore, the influence of the vibration of the vibrating body 34b of the second function element 102 via the substrate 10 on the displacement of the movable body 50 of the third function element 103 due to a Coriolis force can be restrained more securely.

According to the gyro sensor 100, the Z-axis direction is the same as the direction of thickness of the substrate 10. That is, the vibrating bodies 34a, 34b, 34c of the function elements 101, 102, 103 vibrate in a direction orthogonal to the Z-axis direction (in the X-axis direction or in the Y-axis direction). Therefore, the movable drive electrode portion 36 and the fixed drive electrode portions 38a, 38b causing the vibrating body 34a, 34b, 34c to vibrate can be formed, for example, by patterning the same silicon substrate with photolithography and etching techniques. Thus, the gaps between the movable drive electrode portion 36 and the fixed drive electrode portions 38a, 38b can be formed at a lost cost and with high accuracy. For example, in the case where the vibrating body is made to vibrate in the Z-axis direction, the fixed drive electrode portions need to be formed in the Z-axis direction of the movable drive electrode portion, and the movable drive electrode portion and the fixed drive electrode portions cannot be formed by processing the same substrate. Therefore, the cost rises, and in some cases, the gaps between the movable drive electrode portion and the fixed drive electrode portions cannot be formed with high accuracy.

According to the gyro sensor 100, the material of the substrate 10 is glass and the material of the vibrating body 34a, 34b, 34c and the movable body 40, 50 of the function elements 101, 102, 103 is silicon. Therefore, silicon can be used as the material of the fixed portion 30 provided integrally with the vibrating body 34a, 34b, 34c and the movable body 40, 50. The fixed portion 30 and the substrate 10 can be joined together by anodic bonding.

1.2. Method for Manufacturing Gyro Sensor

Figure 6:
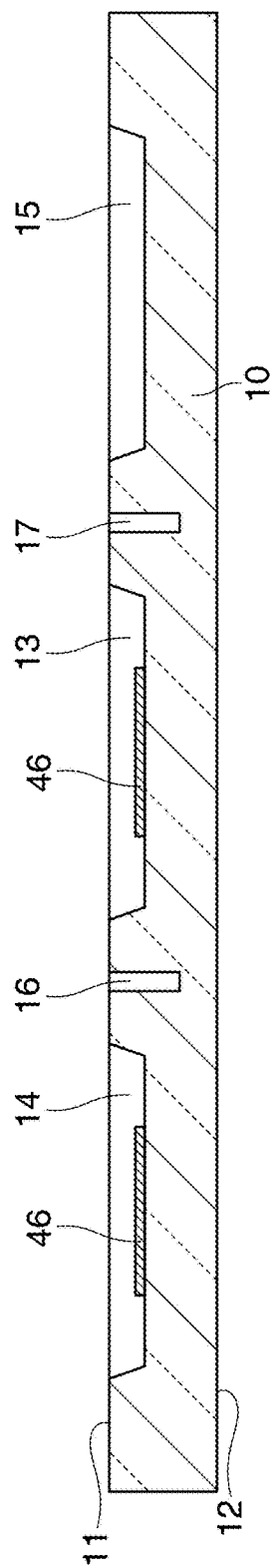
FIG. 6 is a sectional view schematically showing a manufacturing process of the gyro sensor according to the first embodiment.
Figure 7:
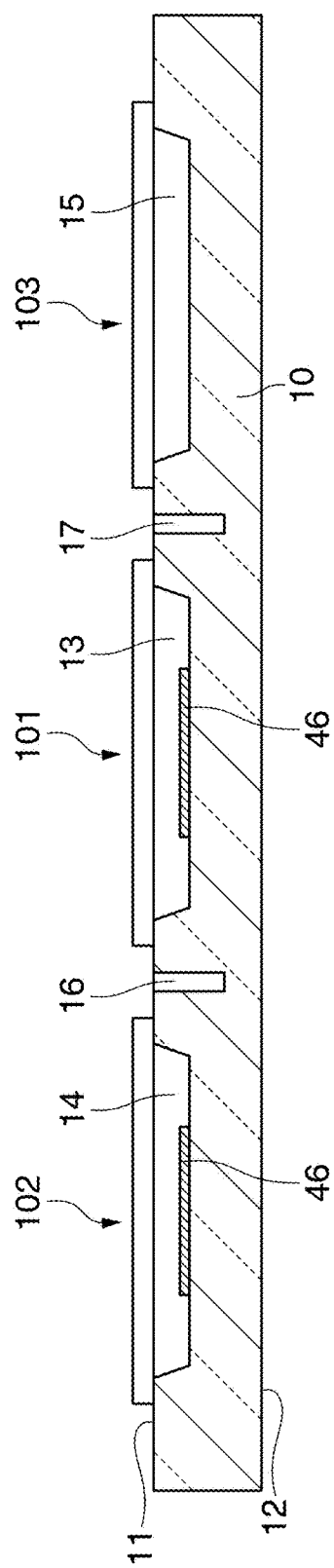
FIG. 7 is a sectional view schematically showing a manufacturing process of the gyro sensor according to the first embodiment.

Next, a method for manufacturing the gyro sensor according to the first embodiment will be described with reference to the drawings. FIGS. 6 and 7 are sectional views schematically showing processes of manufacturing the gyro sensor 100 according to the first embodiment, corresponding to FIG. 2. For convenience, in FIG. 7, the first function element 101, the second function element 102, and the third function element 103 are shown in a simplified manner.

As shown in FIG. 6, for example, a glass substrate is etched to form the recessed portions 13, 14, 15 and the groove portions 16, 17. Thus, the substrate 10 provided with the recessed portions 13, 14, 15 and the groove portions 16, 17 is obtained. The etching may be, for example, drying etching or wet etching.

Next, the fixed detection electrode portion 46 is formed on the substrate 10 (on the bottom surface of the recessed portion 13 and the bottom surface of the recessed portion 14). The fixed detection electrode portion 46 is formed by depositing an electrically conductive layer (not shown) on the substrate 10 with a sputtering method or the like and then patterning the electrically conductive layer with a photolithography and etching techniques.

As shown in FIG. 7, a silicon substrate (not shown) is joined to the substrate 10, for example, by anodic bonding. After the silicon substrate is, for example, ground by a grinder and formed into a thin film, the thin film is patterned in a desired shape. Thus, the function elements 101, 102, 103 are formed. The patterning is carried out by photolithography and etching techniques (for example, dry etching such as reactive ion etching). As a more specific etching technique, the Bosch method can be used. In this process, by patterning (etching) the silicon substrate, the fixed portion 30, the drive spring portion 32, the vibrating body 34a, 34b, the movable drive electrode portion 36, the movable body 40, the beam portion 42, and the movable detection electrode portion 44 of the first function element 101 and the second function element 102 are formed integrally, and the fixed portion 30, the drive spring portion 32, the vibrating body 34c, the movable drive electrode portion 36, the movable body 50, the detection spring portion 52, and the movable detection electrode portion 54 of the third function element 103 are formed integrally.

As shown in FIG. 2, the lid body 20 is joined to the substrate 10, for example, by anodic bonding. The function elements 101, 102, 103 are accommodated in the space 22 formed by the substrate 10 and the lid body 20. For example, by carrying out this process in a reduced-pressure state, the space 22 can be airtightly sealed in the reduced-pressure state.

By the above processes, the gyro sensor 100 can be manufactured.

1.3. Modification of Gyro Sensor

Next, a gyro sensor according to a modification of the first embodiment will be described with reference to the drawings. Hereinafter, a gyro sensor according to a modification of the first embodiment will be described in terms of different features from the gyro sensor 100 according to the first embodiment, and the description of similar parts is omitted.

Figure 8:
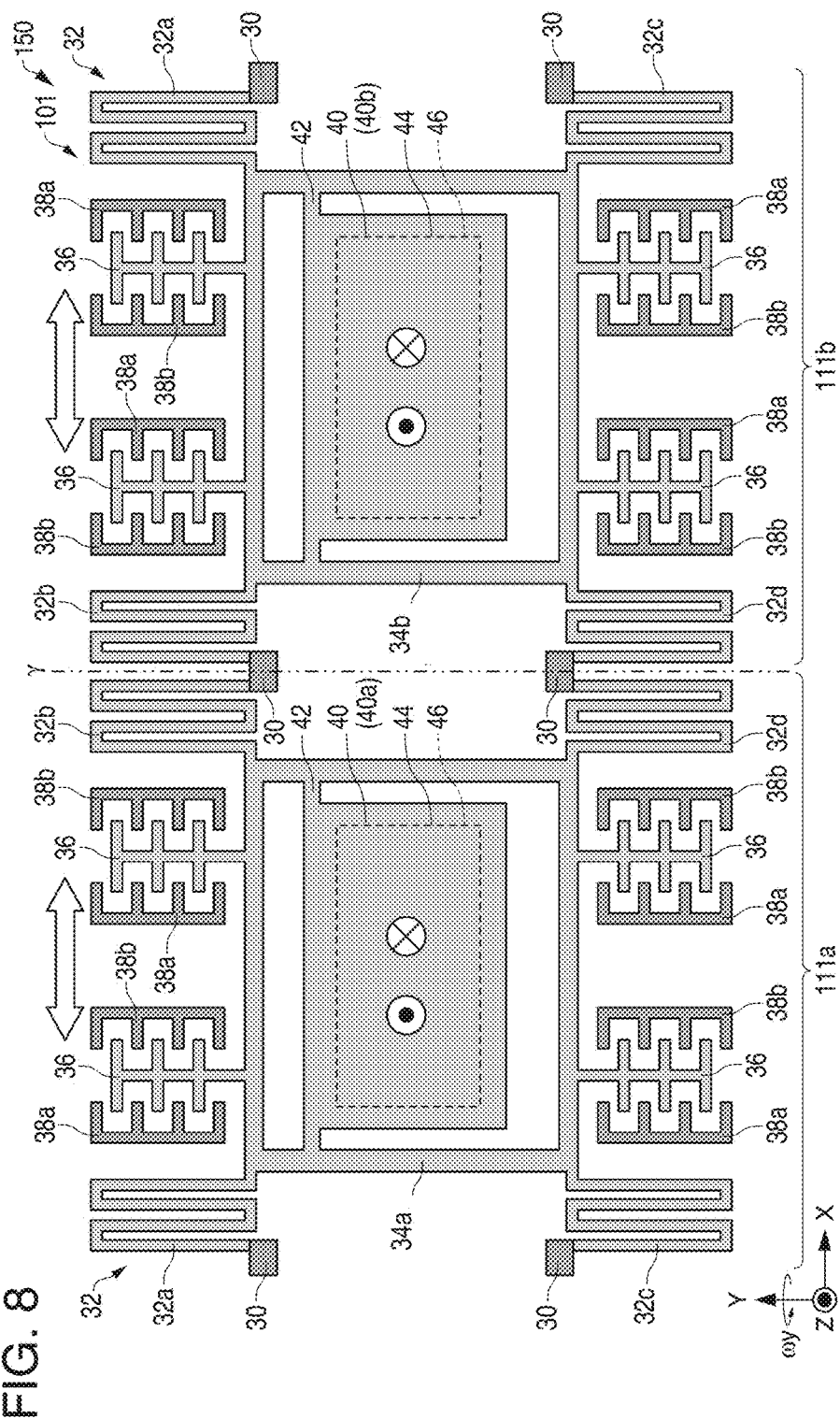
FIG. 8 is a plan view schematically showing a first function element of a gyro sensor according to a modification of the first embodiment.

First, a first function element of a gyro sensor according to a modification of the first embodiment will be described. FIG. 8 is a plan view schematically showing a first function element 101 of a gyro sensor 150 according to a modification of the first embodiment.

The first function element 101 of the gyro sensor 100 has one structure body 111, as shown in FIG. 3. However, the first function element 101 of the gyro sensor 150 has two structure bodies 111, as shown in FIG. 8.

The two structure bodies 111 (111*a*, 111*b*) are provided side by side in the X-axis direction so that these structure bodies become symmetrical about an axis γ that is parallel to the Y axis. In the illustrated example, in the structure bodies 111*a*, 111*b*, the fixed portion 30 on the +X axis direction side of the structure body 111*a* and the fixed portion 30 on the −X axis direction side of the structure body 111*b* are shared fixed portions.

In the structure body 111*a*, the fixed drive electrode portion 38*a* is arranged on the −X axis direction side of the movable drive electrode portion 36, and the fixed drive electrode portion 38*b* is arranged on the +X axis direction side of the movable drive electrode portion 36. In the structure body 111*b*, the fixed drive electrode portion 38*a* is arranged on the +X axis direction side of the movable drive electrode portion 36, and the fixed drive electrode portion 38*b* is arranged on the −X axis direction side of the movable drive electrode portion 36. Therefore, by applying a first alternating voltage between the movable drive electrode portion 36 and the fixed drive electrode portion 38*a*, and applying a second alternating voltage with a phase 180 degrees shifted from the first alternating voltage between the movable drive electrode portion 36 and fixed drive electrode portion 38*b*, a vibrating body 34*a* of the structure body 111*a* and a vibrating body 34*b* of the structure body 111*b* can be made to vibrate (in a tuning-fork vibration pattern) in the X-axis direction with opposite phases to each other and at a predetermined frequency. That is, the first function element 101 can vibrate in a tuning-fork vibration pattern.

More specifically, first, the vibrating body 34*a* is displaced in the −X axis direction and the vibrating body 34*b* is displaced in the +X axis direction. Next, the vibrating body 34*a* is displaced in the +X axis direction and the vibrating body 34*b* is displaced in the −X axis direction. The vibrating bodies 34*a*, 34*b* repeat these actions. Thus, the vibrating bodies 34*a*, 34*b* vibrate in opposite phases to each other.

If an angular velocity ωy about the Y axis is applied to the first function element 101 in the state where the vibrating bodies 34*a*, 34*b* perform the above vibration, a Coriolis force acts and causes a movable body 40*a* of the structure body 111*a* and a movable body 40*b* of the structure body 111*b* are displaced in opposite directions to each other in the Z-axis direction (along the Z axis).

More specifically, for example, first, the movable body 40*a* is displaced in the −Z axis direction and the movable body 40*b* is displaced in the +Z axis direction. Next, the movable body 40*a* is displaced in the +Z axis direction and the movable body 40*b* is displaced in the −Z axis direction. The movable bodies 40*a*, 40*b* repeat these actions while receiving a Coriolis force.

In the first function element 101 of the gyro sensor 150, the movable bodies 40*a*, 40*b* are displaced in opposite directions to each other by a Coriolis force, as described above. Therefore, in the first function element 101 of the gyro sensor 150, for example, an error generated by angular velocity about the Z axis or by acceleration in the Z-axis direction can be canceled by signal processing and detection accuracy for angular velocity about the Y axis can be improved.

Although not shown, the first function element of the gyro sensor 150 may employ a form in which two structure bodies are connected along the Y axis, with the vibrating bodies of the two structure bodies vibrating in opposite phases to each other along the X axis (walk pattern).

Next, a second function element of the gyro sensor 150 will be described. The second function element of the gyro sensor 150 has a form in which the first function element 101 of the gyro sensor 150 shown in FIG. 8 is rotated 90 degrees about the Z axis as its axis of rotation. Therefore, the detail description of the second function element of the gyro sensor 150 is omitted.

In the second function element of the gyro sensor 150, detection accuracy for angular velocity about the X axis can be improved.

Figure 9:
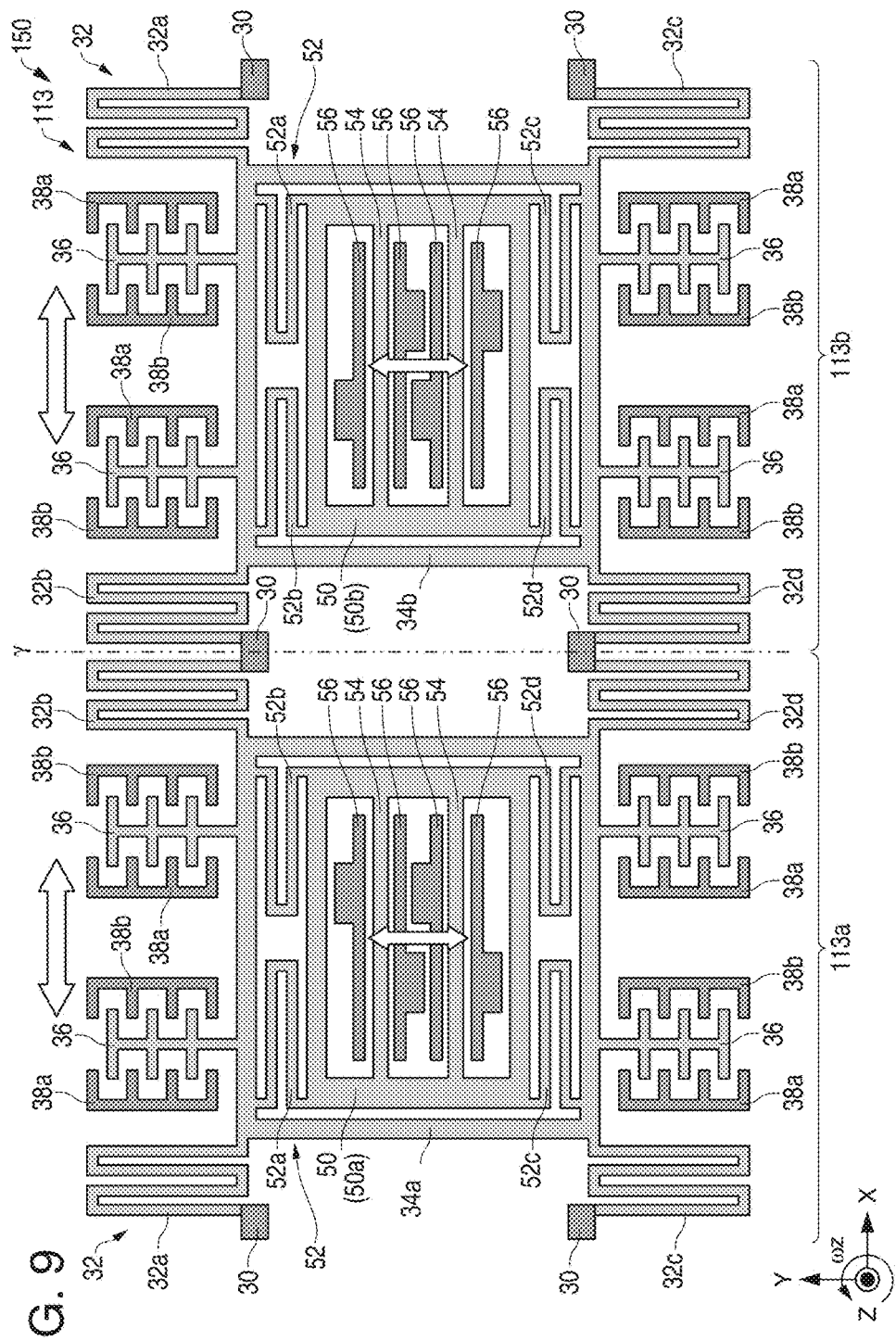
FIG. 9 is a plan view schematically showing a third function element of a gyro sensor according to a modification of the first embodiment.

Next, a third function element of the gyro sensor 150 will be described. FIG. 9 is a plan view schematically showing a third function element 103 of the gyro sensor 150.

The third function element 103 of the gyro sensor 100 has one structure body 113, as shown in FIG. 5. However, the third function element 103 of the gyro sensor 150 has two structure bodies 113, as shown in FIG. 9.

The two structure bodies 113 (113*a*, 113*b*) are provided side by side in the X-axis direction so that these structure bodies become symmetrical about an axis γ that is parallel to the Y axis. In the illustrated example, in the structure bodies 113*a*, 113*b*, the fixed portion 30 on the +X axis direction side of the structure body 113*a* and the fixed portion 30 on the −X axis direction side of the structure body 113*b* are shared fixed portions.

In the third function element 103 of the gyro sensor 150, as in the first function element 101 of the gyro sensor 150, a vibrating body 34*a* of the structure body 113*a* and a vibrating body 34*b* of the structure body 113*b* can be made to vibrate (in a tuning-fork vibration pattern) along the X axis with opposite phases to each other and at a predetermined frequency. That is, the third function element 103 can vibrate in a tuning-fork vibration pattern.

If an angular velocity ωz about the Z axis is applied to the third function element 103 in the state where the vibrating bodies 34*a*, 34*b* perform the above vibration, a Coriolis force acts and causes a movable body 50*a* of the structure body 113*a* and a movable body 50*b* of the structure body 113*b* are displaced in opposite directions to each other in the Y-axis direction (along the Y axis).

More specifically, for example, first, the movable body 50*a* is displaced in the +Y axis direction and the movable body 50*b* is displaced in the −Y axis direction. Next, the movable body 50*a* is displaced in the −Y axis direction and the movable body 50*b* is displaced in the +Y axis direction. The movable bodies 50*a*, 50*b* repeat these actions while receiving a Coriolis force.

The third function element 103 of the gyro sensor 150, the movable bodies 50*a*, 50*b* are displaced in opposite directions to each other by a Coriolis force, as described above.

Therefore, in the third function element 103 of the gyro sensor 150, for example, an error generated by acceleration in the Y-axis direction can be canceled by signal processing and detection accuracy for angular velocity about the Z axis can be improved.

Although not shown, the third function element of the gyro sensor 150 may employ a form in which two structure bodies are connected along the Y axis, with the vibrating bodies of the two structure bodies vibrating in opposite phases to each other along the X axis (walk pattern).

According to the gyro sensor 150, detection accuracy for angular velocity can be improved as described above, compared with the gyro sensor 100.

2. Second Embodiment 2.1. Gyro Sensor

Figure 10:
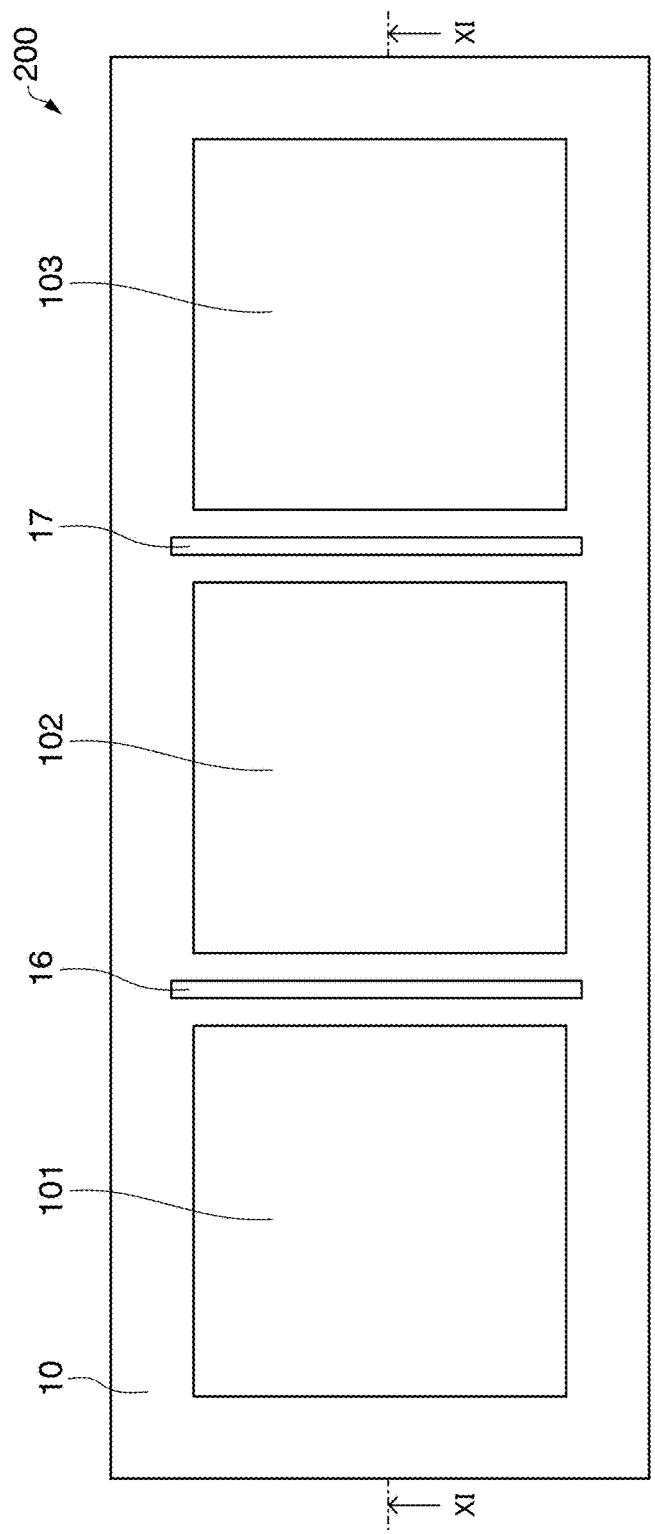
FIG. 10 is a plan view schematically showing a gyro sensor according to a second embodiment.
Figure 11:
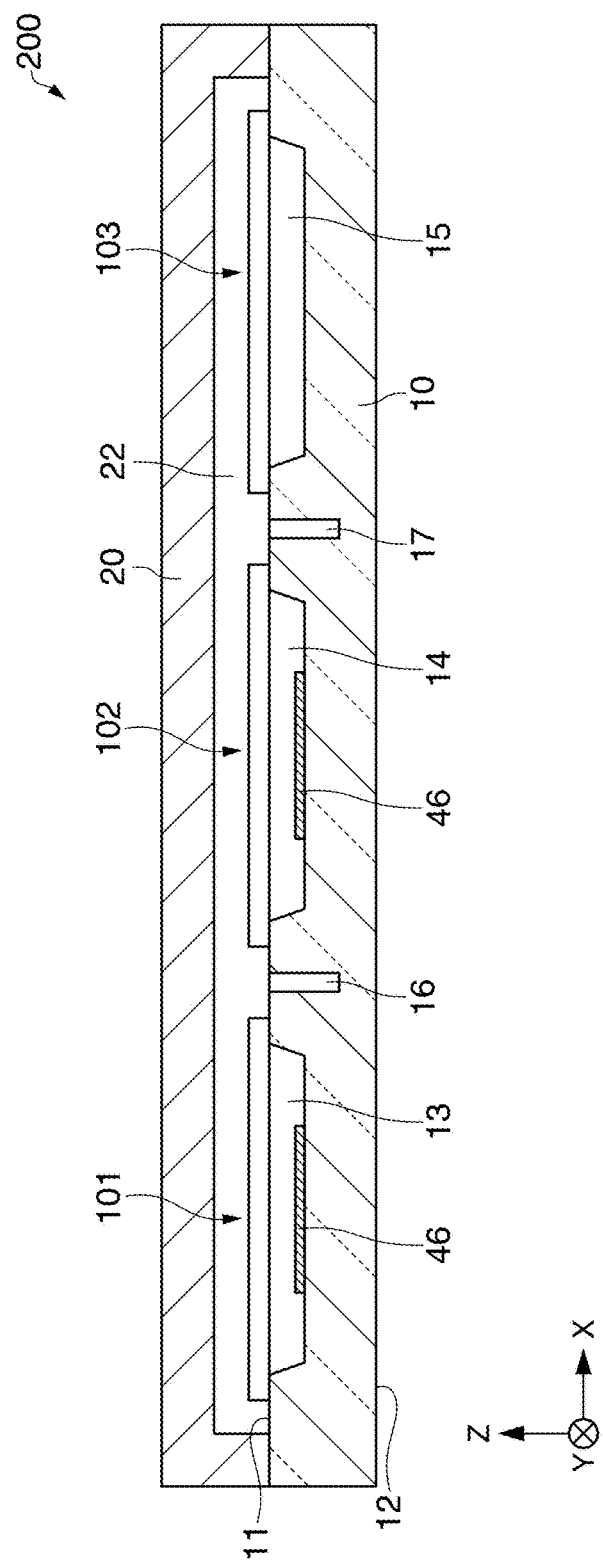
FIG. 11 is a sectional view schematically showing the gyro sensor according to the second embodiment.
Figure 12:
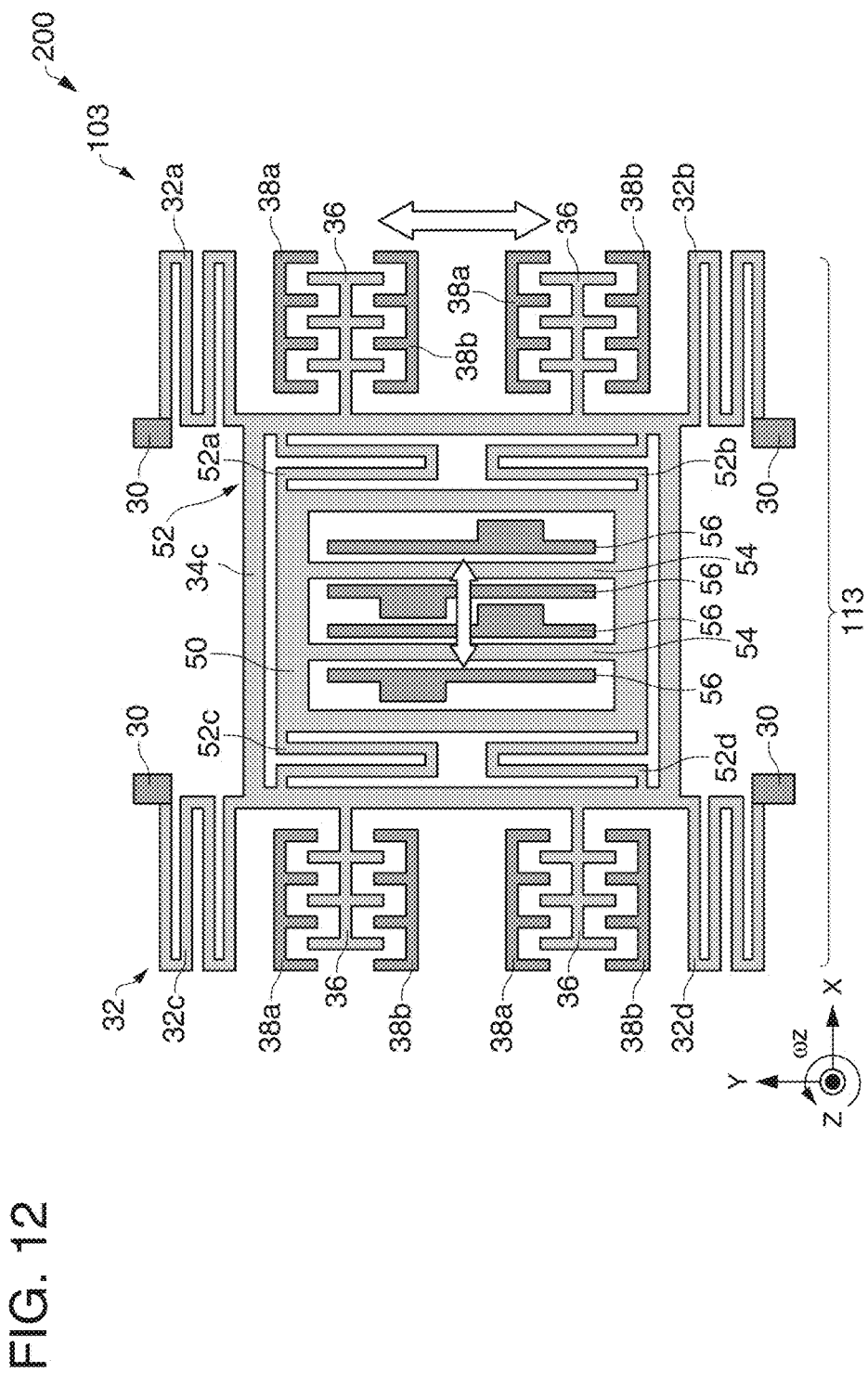
FIG. 12 is a plan view schematically showing a third function element of the gyro sensor according to the second embodiment.

Next, a gyro sensor according to a second embodiment will be described with reference to the drawings. FIG. 10 is a plan view schematically showing a gyro sensor 200 according to the second embodiment. FIG. 11 is a sectional view taken along line XI-XI in FIG. 10, schematically showing the gyro sensor 200 according to the second embodiment. FIG. 12 is a plan view showing a third function element 103 of the gyro sensor 200 according to the second embodiment.

For convenience, the lid body 20 is not shown in FIG. 10. Also, in FIGS. 10 and 11, the first function element 101, the second function element 102, and the third function element 103 are shown in a simplified manner.

Hereinafter, with respect to the gyro sensor 200 according to the second embodiment, members having similar functions to component members of the gyro sensor 100 according to the first embodiment are denoted by the same reference numerals and will not be described further in detail.

In the gyro sensor 100, the first function element 101 is provided between the second function element 102 and the third function element 103, as shown in FIGS. 1 and 2. That is, in the gyro sensor 100, the second function element 102, the first function element 101, and the third function element 103 are arrayed linearly in this order.

On the other hand, in the gyro sensor 200, the second function element 102 is provided between the first function element 101 and the third function element 103, as shown in FIGS. 10 and 11. That is, in the gyro sensor 200, the first function element 101, the second function element 102, and the third function element 103 are arrayed linearly in this order. The third function element 103 of the gyro sensor 200 takes a form in which the third function element 103 of the gyro sensor 100 shown in FIG. 5 is rotated 90 degrees about the Z axis as its axis of rotation, as shown in FIG. 12. Therefore, the detailed description of the third function element 103 of the gyro sensor 200 is omitted.

In the third function element 103 of the gyro sensor 200, the vibrating body 34c vibrates in the Y-axis direction. If an angular velocity ωz about the Z axis is applied in the state where the vibrating body 34c vibrates in the Y-axis direction, a Coriolis force acts and causes the movable body 50 to be displaced in the X-axis direction. Thus, the electrostatic capacitance between the movable detection electrode portion 54 and the fixed detection electrode portion 56 changes, and the angular velocity ωz about the Z axis can be found.

According to the gyro sensor 200, the function elements 101, 102, 103 are arrayed linearly, and the second function element 102 is provided between the first function element 101 and the third function element 103. Therefore, in the gyro sensor 200, with respect to the function elements 101, 102, which are next to each other, the direction of vibration of the vibrating body 34a of the first function element 101 (X-axis direction) and the direction of displacement of the movable body 40 of the second function element 102 (Z-axis direction) are different from each other, and the direction of displacement of the movable body 40 of the first function element 101 (Z-axis direction) and the direction of vibration of the vibrating body 34b of the second function element 102 (Y-axis direction) are different from each other. Also, with respect to the function elements 102, 103, which are next to each other, the direction of vibration of the vibrating body 34b of the second function element 102 (Y-axis direction) and the direction of displacement of the movable body 50 of the third function element 103 (X-axis direction) are different from each other, and the direction of displacement of the movable body 40 of the second function element 102 (Z-axis direction) and the direction of vibration of the vibrating body 34c of the third function element 103 (Y-axis direction) are different from each other.

That is, in the gyro sensor 200, the first function element 101, in which the vibrating body 34a vibrates in the X-axis direction, and the third function element 103, in which the movable body 50 is displaced in the X-axis direction by a Coriolis force, are not laid next to each other. Therefore, in the gyro sensor 200, as in the gyro sensor 100, high detection accuracy can be achieved while reduction in size is realized.

Moreover, according to the gyro sensor 200, the second recessed portion 14 is provided between the first function element 101 and the third function element 103, as viewed in a plan view. Therefore, the influence of the vibration of the vibrating body 34a of the first function element 101 via the substrate 10 on the displacement of the movable body 50 of the third function element 103 due to a Coriolis force can be restrained more securely.

Furthermore, according to the gyro sensor 200, the groove portions 16, 17 are provided between the first function element 101 and the third function element 103, as viewed in a plan view. Therefore, the influence of the vibration of the vibrating body 34a of the first function element 101 via the substrate 10 on the displacement of the movable body 50 of the third function element 103 due to a Coriolis force can be restrained more securely.

2.2. Method for Manufacturing Gyro Sensor

Next, a method for manufacturing the gyro sensor according to the second embodiment will be described. The method for manufacturing the gyro sensor 200 according to the second embodiment is basically the same as the method for manufacturing the gyro sensor 100 according to the first embodiment. Therefore, the detailed description of the method for manufacturing the gyro sensor 200 is omitted.

3. Third Embodiment

Next, an electronic apparatus according to a third embodiment will be described with reference to the drawings. The electronic apparatus according to the third embodiment includes a gyro sensor according to the embodiment of the invention. Hereinafter, an electronic apparatus including the gyro sensor 100 as a gyro sensor according to an embodiment of the invention will be described.

Figure 13:
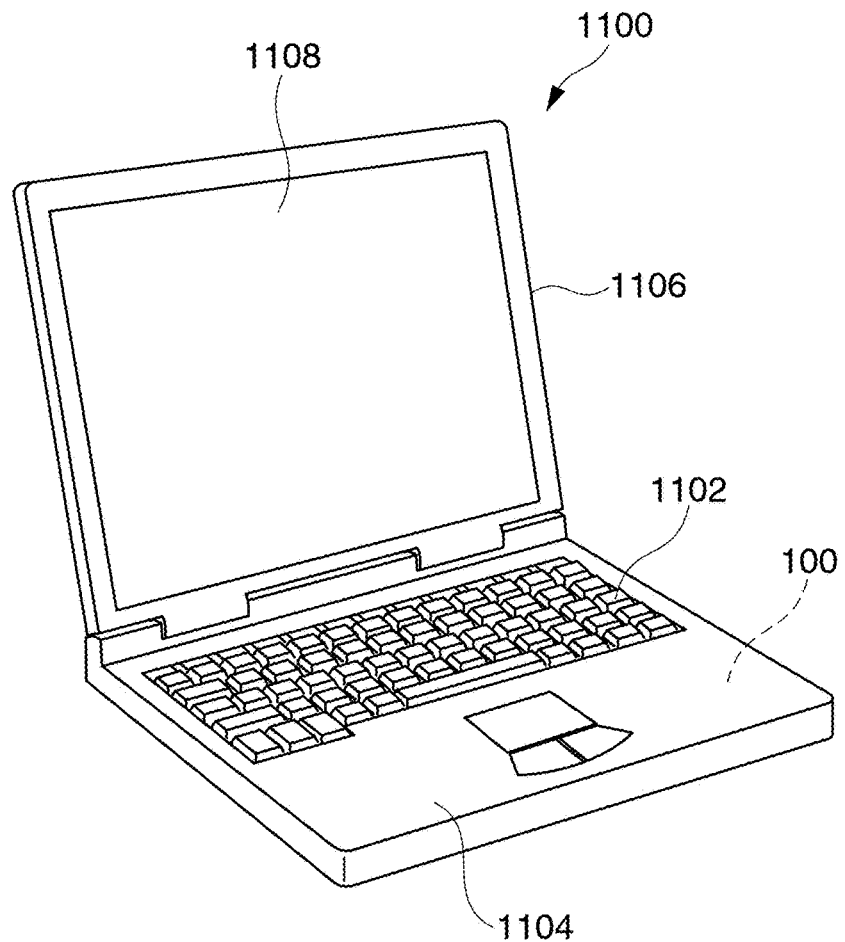
FIG. 13 is a perspective view schematically showing an electronic apparatus according to a third embodiment.

FIG. 13 is a perspective view schematically showing a mobile-type (or notebook-type) personal computer 1100 as an electronic apparatus according to the third embodiment.

As shown in FIG. 13, the personal computer 1100 includes a main body unit 1104 having a keyboard 1102, and a display unit 1106 having a display section 1108. The display unit 1106 is rotatably supported on the main body unit 1104 via a hinge structure portion.

The gyro sensor 100 is installed within such a personal computer 1100.

Figure 14:
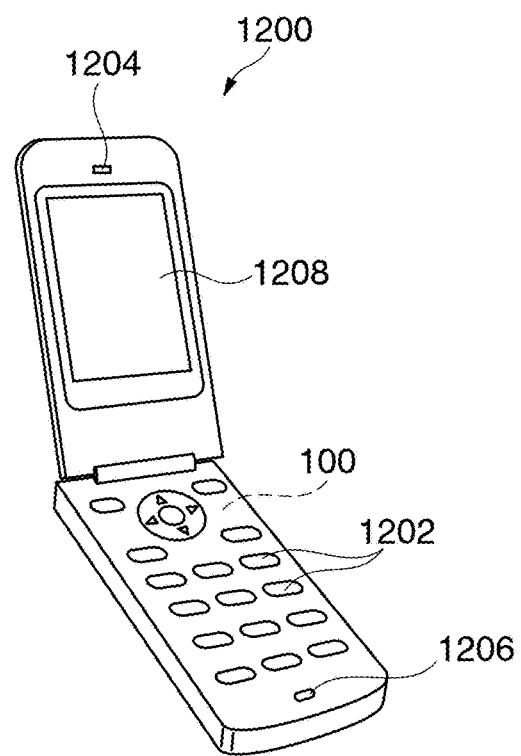
FIG. 14 is a perspective view schematically showing the electronic apparatus according to the third embodiment.

FIG. 14 is a perspective view schematically showing a mobile phone unit (including a PHS) 1200 as an electronic apparatus according to the third embodiment.

As shown in FIG. 14, the mobile phone unit 1200 includes plural operation buttons 1202, and a receiver opening 1204 and a transmitter opening 1206. A display section 1208 is arranged between the operation buttons 1202 and the receiver opening 1204.

The gyro sensor 100 is installed within such a mobile phone unit 1200.

Figure 15:
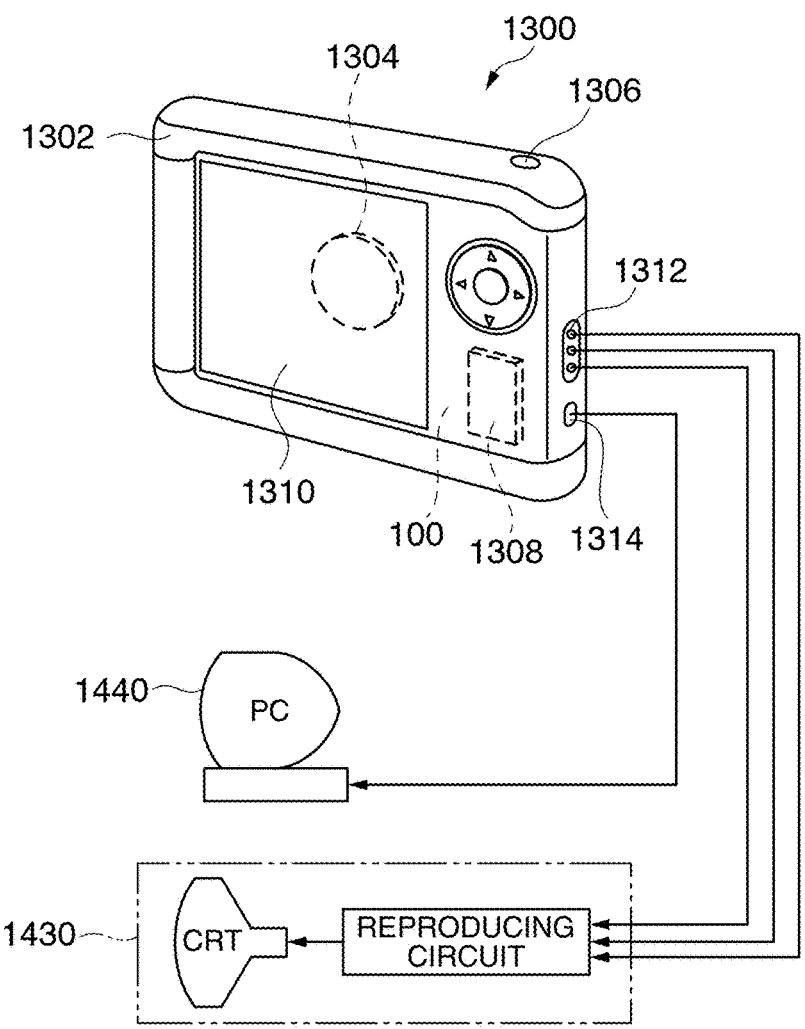
FIG. 15 is a perspective view schematically showing the electronic apparatus according to the third embodiment.

FIG. 15 is a perspective view schematically showing a digital still camera 1300 as an electronic apparatus according to the third embodiment. FIG. 15 also shows connections to external devices in a simplified manner.

Here, while an ordinary camera exposes a silver halide photographic film to an optical image of a subject, the digital still camera 1300 photoelectrically converts an optical image of a subject with an image pickup element such as CCD (charge coupled device) and thus generates an image pickup signal (image signal).

A display section 1310 is provided on a back side of a case (body) 1302 of the digital still camera 1300 and is configured to show a display based on an image pickup signal from the CCD. The display section 1310 functions as a viewfinder which displays a subject in the form of an electronic image.

A light receiving unit 1304 including an optical lens (image pickup system), CCD and the like is provided on a front side of the case 1302 (on the rear side in FIG. 15).

As a photographer confirms a subject image displayed in the display section 1310 and presses a shutter button 1306, an image pickup signal in the CCD at the time point is transferred to and stored in a memory 1308.

In this digital still camera 1300, a video signal output terminal 1312 and an input/output terminal for data communication 1314 are provided on a lateral side of the case 1302. A television monitor 1430 is connected to the video signal output terminal 1312, and a personal computer 1440 is connected to the input/output terminal for data communication 1314, according to need. Moreover, with a predetermined operation, the image pickup signal stored in the memory 1308 is outputted to the television monitor 1430 and the personal computer 1440.

The gyro sensor 100 is installed within such a digital still camera 1300.

The above electronic apparatuses 1100, 1200, 1300 include the gyro sensor 100 and therefore can achieve high detection accuracy while realizing reduction in size.

Also, an electronic apparatus having the gyro sensor 100 can be applied to, for example, ink-jet ejection devices (for example, ink jet printers), laptop personal computers, television sets, video cameras, video tape recorders, head-mounted displays, various navigation systems, pagers, electronic notebooks (including those with communication function), electronic dictionaries, electronic calculators, electronic gaming machines, word processors, work stations, TV phones, surveillance television monitors, digital binoculars, POS terminals, medical apparatuses (for example, digital thermometers, sphygmomanometers, blood glucose meters, electrocardiographic measuring devices, ultrasonic diagnosis devices, electronic endoscopes), fish-finders, various measuring devices, gauges (for example, gauges on vehicles, aircraft, rockets and vessels), attitude control of robot and human body, flight simulators and the like, as well as the personal computer (mobile-type personal computer) shown in FIG. 13, the mobile phone unit shown in FIG. 14, and the digital still camera shown in FIG. 15.

The above embodiments and modifications are simply examples. The invention is not limited to these embodiments and modifications. For example, various embodiments and modifications can be combined suitably.

The invention includes a configuration that is substantially the same as the configurations described in the embodiments (for example, a configuration having the same function, method and result, or a configuration having the same object and effect). The invention also includes a configuration obtained by replacing a non-essential part of the configurations described in the embodiments. Moreover, the invention includes a configuration that has the same effect and advantage as the configurations described in the embodiments, or a configuration that can achieve the same object. Furthermore, the invention includes a configuration obtained by adding a known technique to the configurations described in the embodiments.

The entire disclosure of Japanese Patent Application No. 2012-110209, filed May 14, 2012 is expressly incorporated by reference herein.

What is claimed is:

1. A gyro sensor comprising:
   a substrate; and
   a first function element, a second function element and a third function element which are arranged above the substrate;
   wherein the first function element includes
     a first vibrating body which vibrates in a direction of a first axis, and
     a first movable body which is supported on the first vibrating body and is displaced in accordance with an angular velocity about a second axis orthogonal to the first axis, into a direction of a third axis orthogonal to the first axis and the second axis,
   the second function element includes
     a second vibrating body which vibrates in the direction of the second axis, and
     a second movable body which is supported on the second vibrating body and is displaced in the direction of the third axis in accordance with an angular velocity about the first axis,
   the third function element includes
     a third vibrating body which vibrates in the direction of the first axis or in the direction of the second axis, and
     a third movable body which is supported on the third vibrating body and is displaced in a direction orthogonal to the direction of vibration of the third vibrating body and the direction of the third axis in accordance with an angular velocity about the third axis, and,
   wherein the first, second, and third function elements are arranged linearly,
   with respect to function elements next to each other of the first function element, the second function element and the third function element,
   the direction of vibration of the vibrating body of one function element is different from the direction of displacement of the movable body of the other function element,
   the direction of displacement of the movable body of the one function element is different from the direction of vibration of the vibrating body of the other function element, and wherein a groove portion is provided on the substrate on the same side of the substrate as the one function element and the other function element and extends only partially through the substrate, and the groove portion is a rectangular groove provided between the one function element and the other function element and separates the one function element from the other function element, as viewed in a plan view, and extends parallel to a side of the one function element and the other function element in a width direction across the substrate.

2. The gyro sensor according to claim 1, wherein the second function element is arranged on one side of the first function element, and the third function element is arranged on the other side of the first function element.

3. The gyro sensor according to claim 1, wherein the first function element is arranged on one side of the second function element, and the third function element is provided on the other side of the second function element.

4. The gyro sensor according to claim 1, wherein a first recessed portion, a second recessed portion, and a third recessed portion are provided on the substrate,
the first vibrating body and the first movable body are provided over the first recessed portion,
the second vibrating body and the second movable body are provided over the second recessed portion, and
the third vibrating body and the third movable body are provided over the third recessed portion.

5. The gyro sensor according to claim 1, wherein the direction of the third axis is the same as a direction of thickness of the substrate.

6. The gyro sensor according to claim 1, wherein a material of the substrate is glass, and
a material of the first vibrating body, the first movable body, the second vibrating body, the second movable body, the third vibrating body, and the third movable body is silicon.

7. The gyro sensor according to claim 1, wherein the third vibrating body vibrates in the direction of the first axis, and
the first function element is provided between the second function element and the third function element.

8. The gyro sensor according to claim 1, wherein the third vibrating body vibrates in the direction of the second axis, and
the second function element is provided between the first function element and the third function element.

9. The gyro sensor according to claim 1, wherein the first function element, the second function element, and the third function element are arrayed substantially linearly on the substrate.

10. The gyro sensor according to claim 2, wherein the first function element, the second function element, and the third function element are arrayed substantially linearly on the substrate.

11. The gyro sensor according to claim 3, wherein the first function element, the second function element, and the third function element are arrayed substantially linearly on the substrate.

12. The gyro sensor according to claim 1, wherein at least one function element of the first function element, the second function element, and the third function element vibrates in a tuning fork vibration pattern.

13. An electronic apparatus comprising the gyro sensor according to claim 1.

14. An electronic apparatus comprising the gyro sensor according to claim 2.

15. An electronic apparatus comprising the gyro sensor according to claim 3.

16. An electronic apparatus comprising the gyro sensor according to claim 4.

17. An electronic apparatus comprising the gyro sensor according to claim 7.

18. An electronic apparatus comprising the gyro sensor according to claim 5.

19. An electronic apparatus comprising the gyro sensor according to claim 6.

20. An electronic apparatus comprising the gyro sensor according to claim 8.

21. A gyro sensor comprising:
a substrate; and
a first function element, a second function element, and a third function element which are arranged above the substrate, the first function element being provided between the second function element and the third function element;
wherein the first function element includes
a first vibrating body which vibrates in a direction of a first axis, and
a first movable body which is supported on the first vibrating body and is displaced in accordance with an angular velocity about a second axis orthogonal to the first axis, into a direction of a third axis orthogonal to the first axis and the second axis,
the second function element includes
a second vibrating body which vibrates in the direction of the second axis, and
a second movable body which is supported on the second vibrating body and is displaced in the direction of the third axis in accordance with an angular velocity about the first axis,
the third function element includes
a third vibrating body which vibrates in the direction of the first axis, and
a third movable body which is supported on the third vibrating body and is displaced in a direction orthogonal to the direction of vibration of the third vibrating body and the direction of the third axis in accordance with an angular velocity about the third axis, and
wherein the first, second, and third function elements are arranged along the first axis,
a direction of vibration of the first vibrating body of the first function element is orthogonal to a direction of displacement of the second movable body of the second function element and is orthogonal to a direction of displacement of the third movable body of the third function element,
the direction of vibration of the vibrating body of one function element is different from the direction of displacement of the movable body of the other function element,
the direction of displacement of the movable body of the one function element is different from the direction of vibration of the vibrating body of the other function element, and
wherein a groove portion is provided on the substrate on the same side of the substrate as the one function element and the other function element and extends only partially through the substrate, and the groove portion is a rectangular groove provided between the one function element and the other function element and separates the one function element from the other function element, as viewed in a plan view, and extends parallel to a side of the one function element and the other function element in a width direction across the substrate.

22. A gyro sensor comprising:
a substrate;
a first function element, a second function element, and a third function element which are arranged above the substrate, the first function element being provided between the second function element and the third function element; and
a groove provided on the substrate on the same side of the substrate as the first function element, the second function element, and the third function element, the groove extending only partially through the substrate and separating the first function element from the second function element,
wherein the first function element includes
a first vibrating body which vibrates in a direction of a first axis, and
a first movable body which is supported on the first vibrating body and is displaced in accordance with an angular velocity about a second axis orthogonal to the first axis, into a direction of a third axis orthogonal to the first axis and the second axis,
the second function element includes
a second vibrating body which vibrates in the direction of the second axis, and
a second movable body which is supported on the second vibrating body and is displaced in the direction of the third axis in accordance with an angular velocity about the first axis,
the third function element includes
a third vibrating body which vibrates in the direction of the first axis, and
a third movable body which is supported on the third vibrating body and is displaced in a direction orthogonal to the direction of vibration of the third vibrating body and the direction of the third axis in accordance with an angular velocity about the third axis, and
wherein the first, second, and third function elements are arranged along the first axis, and
a direction of vibration of the first vibrating body of the first function element is orthogonal to a direction of displacement of the second movable body of the second function element and is orthogonal to a direction of displacement of the third movable body of the third function element.

* * * * *